(12) United States Patent
Laukien

(10) Patent No.: US 6,707,201 B2
(45) Date of Patent: Mar. 16, 2004

(54) CYLINDER FOR GUIDING AT LEAST ONE YARN

(75) Inventor: Dirk Laukien, Kiel (DE)

(73) Assignee: Neumag GmbH & Co. KG (DE)

( * ) Notice: Subject to any disclaimer, the term of this patent is extended or adjusted under 35 U.S.C. 154(b) by 0 days.

(21) Appl. No.: 10/097,364

(22) Filed: Mar. 14, 2002

(65) Prior Publication Data

US 2002/0130572 A1 Sep. 19, 2002

(30) Foreign Application Priority Data

Mar. 15, 2001 (DE) .......................... 101 12 423

(51) Int. Cl.[7] ................................. H20K 7/09
(52) U.S. Cl. ..................... 310/90.5; 310/68 B; 310/90; 310/156.05
(58) Field of Search ..................... 310/90.5, 90, 156.05, 310/68 B (56) References Cited

U.S. PATENT DOCUMENTS

| | | | |
|---|---|---|---|
| 4,091,687 A | | 5/1978 | Meinke et al. ................ 74/574 |
| 4,914,387 A | * | 4/1990 | Santos ........................ 324/166 |
| 5,256,952 A | | 10/1993 | Yoneyama et al. .......... 318/629 |
| 5,385,007 A | * | 1/1995 | Hartel ............................ 57/76 |
| 5,504,381 A | | 4/1996 | Kato ........................... 310/51 |
| 6,003,375 A | * | 12/1999 | Ouchi ....................... 73/414.39 |
| 6,302,641 B1 | * | 10/2001 | Iwane ......................... 415/72 |

FOREIGN PATENT DOCUMENTS

| | | | |
|---|---|---|---|
| DE | 197 33 239 A1 | 2/1999 | |
| DE | 0 770 719 B1 | 5/2000 | |
| EP | 0 770 719 A1 | 5/1997 | |
| EP | 07707719 | * 5/2000 | ............ D02J/13/00 |
| EP | 1 231 308 A1 | 8/2002 | |
| GB | 1 422 282 | 1/1976 | |
| WO | WO 02/068834 A1 | 9/2002 | |

* cited by examiner

Primary Examiner—Burton S. Mullins
Assistant Examiner—Iraj A. Mohandesi
(74) Attorney, Agent, or Firm—Kennedy Covington Lobdell & Hickman, LLP (57) ABSTRACT

A cylinder for guiding yarn comprises a hollow-cylindrical jacket seated on a support by radially acting magnetic bearings having plural pole windings distributed circumferentially. The cylinder jacket position is detected by plural sensors coupled with the pole windings by a control unit. The sensors are spaced from the cylinder jacket and from the support for determining the actual position of the cylinder jacket relative to a stationary reference position. Vibrations of the cylinder jacket are damped by determining the actual position of the cylinder jacket in relation to a stationary reference position and the chronological change of the actual position as a function of the rotary frequency of the cylinder jacket. Control signals for the magnetic bearing are generated to cause the magnetic bearing to counteract the position change of the cylinder jacket.

10 Claims, 6 Drawing Sheets

Fig.6

CYLINDER FOR GUIDING AT LEAST ONE YARN

CROSS-REFERENCE TO RELATED APPLICATIONS

This application claims the benefit of German patent application 101 12 423.6 filed Mar. 15, 2001, herein incorporated by reference.

FIELD OF THE INVENTION

The present invention relates to a cylinder for guiding at least one yarn and to a method for vibration damping a rotatably seated cylinder jacket of a cylinder. More particularly, the present invention relates to such a yarn-guiding cylinder basically comprising a hollow-cylindrical cylinder jacket, a support on which the cylinder jacket is rotatably seated, at least one magnetic bearing having a plurality of bearing pole windings distributed on the support circumferentially relative to the cylinder jacket, and a plurality of sensors for determining an actual position of the cylinder jacket, with the sensors and the bearing pole windings being coupled with each other by a control unit.

BACKGROUND OF THE INVENTION

Cylinders of various types and shapes for guiding one or several yarns are employed in various textile applications, such as spinning installations or textile machines. For example, such cylinders are employed as godet rolls, which are used for conveying, drafting or heating of yarn. Cylinders are also known which serve as tension cylinders to conduct the yarn to a bobbin surface during winding of the yarn. It is common to all such cylinders that the cylinder jacket is rotatably seated for being operated at a circumferential speed which can essentially be equal to the yarn speed. The cylinder jacket may be seated on a support by means of bearings for this purpose. Cylinders in the form of godet wheels are known from European Patent Publication EP 0 770 719 B1 or German Patent Publication DE 197 33 239 A1, wherein the cylinder jacket is magnetically seated. At least one radially acting magnetic bearing is provided for this purpose, which bearing has a plurality of bearing pole windings distributed on the support. The bearing pole windings are evenly distributed over the circumference of the cylinder jacket. Sensors are associated with the bearing pole windings to monitor a bearing gap between the godet wheel jacket and the bearing pole winding. The sensors and the bearing pole windings are attached together on the support, so that the position of the cylinder jacket can be stabilized in relation to the support. However, with the known cylinders, the problem arises that externally produced resonances and machine vibrations cause the support to experience vibrations which have a negative effect on the control of the position of the godet wheel jacket. Under disfavorable conditions, there is even the possibility that the cylinder jacket is caused additional vibrational excitations, which lead to the instability of the bearing.

SUMMARY OF THE INVENTION

It is accordingly an object of the present invention to further develop a yarn guiding cylinder of the aforementioned type in such a way that the rotatable cylinder jacket is seated with as little vibration as possible.

It is a further goal of the present invention to prevent the danger of deformations of the cylinder as a result of sympathetic vibrations.

These objects are addressed by means of a yarn guiding cylinder of the basic type having a hollow-cylindrical cylinder jacket, a support on which the cylinder jacket is rotatably seated, at least one magnetic bearing having a plurality of bearing pole windings distributed on the support circumferentially relative to the cylinder jacket, and a plurality of sensors for determining an actual position of the cylinder jacket, with the sensors and the bearing pole windings being coupled with each other by a control unit. In accordance with the present invention, the sensors are fixed in place at a distance from the cylinder jacket and at a distance from the support for determining the actual position of the cylinder jacket in relation to a stationary reference position of the cylinder jacket.

The present invention further addresses these basic objects by providing a method for vibration damping of a cylinder jacket of a cylinder which is rotatably seated by at least one radially acting magnetic bearing, wherein the magnetic bearing is controlled as a function of an actual position of the cylinder jacket. Basically, the method of the present invention comprises the steps of:

a) determining the actual position of the cylinder jacket in relation to a stationary reference position of the cylinder jacket, b) determining a chronological change of the actual position of the cylinder jacket as a function of a rotary frequency of the cylinder jacket, c) determining a sequence of control signals for the magnetic bearing from the change of the actual position of the cylinder jacket at the rotary frequency and, via the control signals, causing bearing forces on the cylinder jacket counteracting the change in position of the cylinder jacket, and d) controlling the magnetic bearing by the sequence of control signals at the rotary frequency.

The invention is distinguished in that the sensor arrangement and the actuating device are disengaged from each other. As a result, the vibrations in the support cannot have an effect on the position of the cylinder jacket. To this end, the sensors for determining an actual position of the cylinder jacket are fixed in place at a distance from the cylinder jacket and at a distance from the support in such a way that it is possible to determine the actual position of the cylinder jacket in relation to a stationary reference position of the cylinder jacket. In this case, the reference position of the cylinder jacket constitutes the position of the cylinder jacket which assures an optimal function of the cylinder during operation. Therefore, a position which is predetermined in a machine can be called the stationary reference position. In this case, there is also the possibility that the position of the cylinder defined in the machine changes in the course of operation, such as in connection with a tension cylinder, for example, which yields because of the increase in bobbin size. Here, each change of the position based on the function would constitute a stationary reference position. In this connection, it is important for the invention that the detection of the position of the cylinder jacket takes place independently of the reciprocal effect between the support and the cylinder jacket, and therefore independently of the bearing gap between the respective bearing pole windings and the cylinder jacket.

In order to allow a detection of the position of the cylinder jacket in connection with protrudingly seated cylinder jackets, it is suggested in accordance with an advantageous further development of the invention to fix the sensor in place by means of several protruding sensor supports. In this case, the end of each of the sensor supports is fixedly connected with the machine frame. A sensor, which has a defined position in relation to the stationary reference position of the cylinder jacket, is preferably fastened to the opposite protruding end.

A further embodiment of the invention is particularly advantageous in connection with godet wheels, wherein several yarns are guided on the circumference of the cylinder jacket. In this case, the sensor supports are arranged within an annular space between the cylinder jacket and the support, so that the exterior area of the cylinder remains completely free.

Here, the sensors and the bearing pole windings can be arranged together on a common bearing level, so that a very fast and precise positional regulation of the cylinder jacket by the magnetic bearing is possible.

However, it is also possible to arrange the sensors and/or the bearing pole windings on several adjacent levels. The arrangement of the bearing pole windings on several bearing levels has the advantage that a large bearing capacity and a particularly advantageous stiffness of the bearing is achieved. Such an arrangement is preferred in particular in connection with cantilevered cylinders. In this case, the bearing pole windings can be positioned on the support so they are angularly offset from bearing level to bearing level. Here, the sensors can be arranged on the respective bearing level or an adjacent level.

Basically, two different advantageous embodiments of the cylinder are possible for controlling the bearing pole windings. In a first variant embodiment, one of the sensors is assigned to each one of the bearing pole windings. In this case, a sensor signal from the sensor is converted by the control unit into a control signal for controlling the associated bearing pole winding. With this arrangement, the distance between the sensor and the cylinder jacket is directly measured and is fed to the control unit as the control signal. The difference between a set point distance representing the reference position of the cylinder jacket and an actual distance between the sensor and the cylinder jacket is used in this case as the quantity for forming the control signal.

However, there is also the possibility of detecting the actual position of the cylinder jacket by means of a group of sensors, which are advantageously arranged on one level. Then, the sensor signals are computed in the control unit to provide the actual position of the cylinder jacket, from which the control signals for triggering the respective bearing pole windings are formed. In the process, a conversion takes place in such a way that the bearing gaps existing between the bearing pole windings and the cylinder jacket receive a change required for achieving the end position.

A further alternative is constituted by a further development of the cylinder wherein the bearing pole windings are arranged in pairs on a bearing level, offset by essentially 180°. A sensor is assigned in this case to each pair of bearing poles, and the control unit converts the sensor signal from the sensor into a control signal for controlling the assigned pair of bearing poles.

In order to provide a seating of the cylinder jacket which is as vibration-free and stable as possible, it is proposed in accordance with an advantageous further development of the invention to seat the cylinder jacket by means of two radially acting magnetic bearings. Here, a group of sensors, each arranged on an adjacent level between the bearing levels, is assigned to each magnetic bearing. Thus, there is the possibility of measuring a chronological change in the position of the cylinder jacket, besides the position detection, which have an effect on the cylinder jacket because of vibrations.

By means of the magnetic bearings, it is possible in this manner to perform a vibration damping superimposed on the seating of the bearing jacket. To this end, each group of sensors is connected with a control unit, which performs an evaluation of the sensor signals in view of a position and vibration determination of the cylinder jacket. The control signals generated by the control unit are then fed to the respective bearing pole windings for seating correction and vibration damping.

The method in accordance with the invention for vibration damping of a rotatably seated cylinder jacket can be performed by means of a particularly preferred embodiment which has the advantage that bearing forces are generated by means of the magnetic bearings, to counteract an occurring vibration in amplitude and frequency. Thus, the damping effect becomes effective only in case of an occurring vibration. No damping is performed in operating states in which no relevant vibrations occur. In accordance with the method of the invention, the actual position of the cylinder jacket in relation to a stationary reference position of the cylinder jacket is detected. Simultaneously a chronological change of the actual position of the cylinder jacket is determined as a function of a rotary frequency of the cylinder jacket, which is converted into a sequence of control signals for the magnetic bearing. Here, the control signals cause the generation of bearing forces in the magnetic bearing, which counteract the vibration-caused position change of the cylinder jacket. The rotary frequency of the magnetic bearing is controlled by the sequence of control signals, so that the vibrations are suppressed immediately after they occur.

In an advantageous variant of the present method, the actual position of the cylinder jacket is detected at two measuring spots. There is then the option of detecting first and second order sympathetic vibrations. With the first resonance, the phase position of the chronological changes of the actual position would be the same at both measuring spots. But with a second order resonance, the phase position of the chronological change of the actual position of the cylinder jacket at the two measuring spots would be offset by 180°. One bearing point with a magnetic bearing is assigned respectively to each of the measuring spots, so that the magnetic bearings are respectively controlled by a sequence of control signals for damping the vibrations.

Four sensors, which are arranged on a level at 90° offsets in relation to each other and distributed over the circumference of the cylinder jacket, are preferably used in one measuring spot for detecting the actual position, as well as the chronological change, of the actual position of the cylinder jacket. A high degree of accuracy of the positional determination and the vibration detection is achieved by means of this arrangement.

Several exemplary embodiments of the cylinder in accordance with the present invention will be described in greater detail the following disclosure, with reference to the attached drawings.

DETAILED DESCRIPTION OF THE PREFERRED EMBODIMENTS

Figure 1:
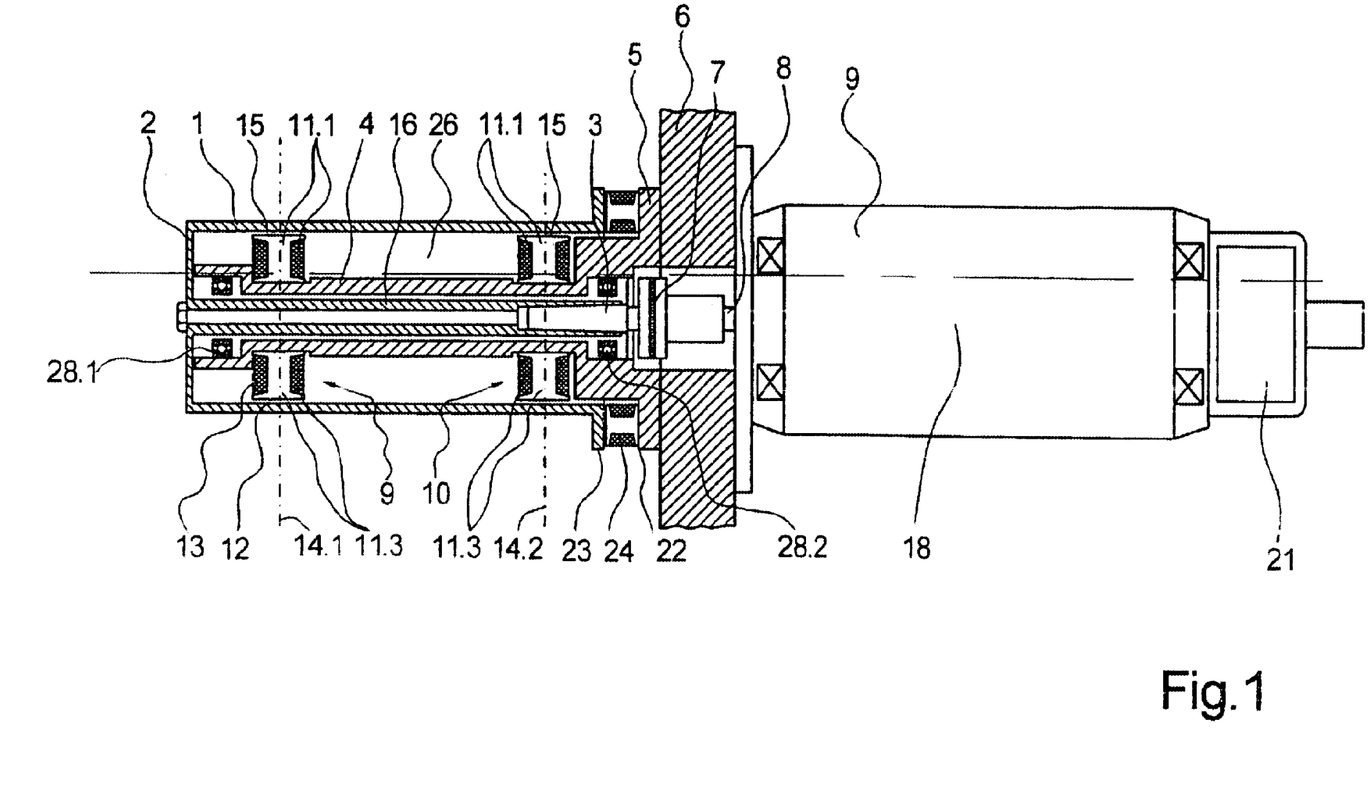
FIGS. 1 to 3 schematically depict a first exemplary embodiment of the cylinder in accordance with the invention.
Figure 2:
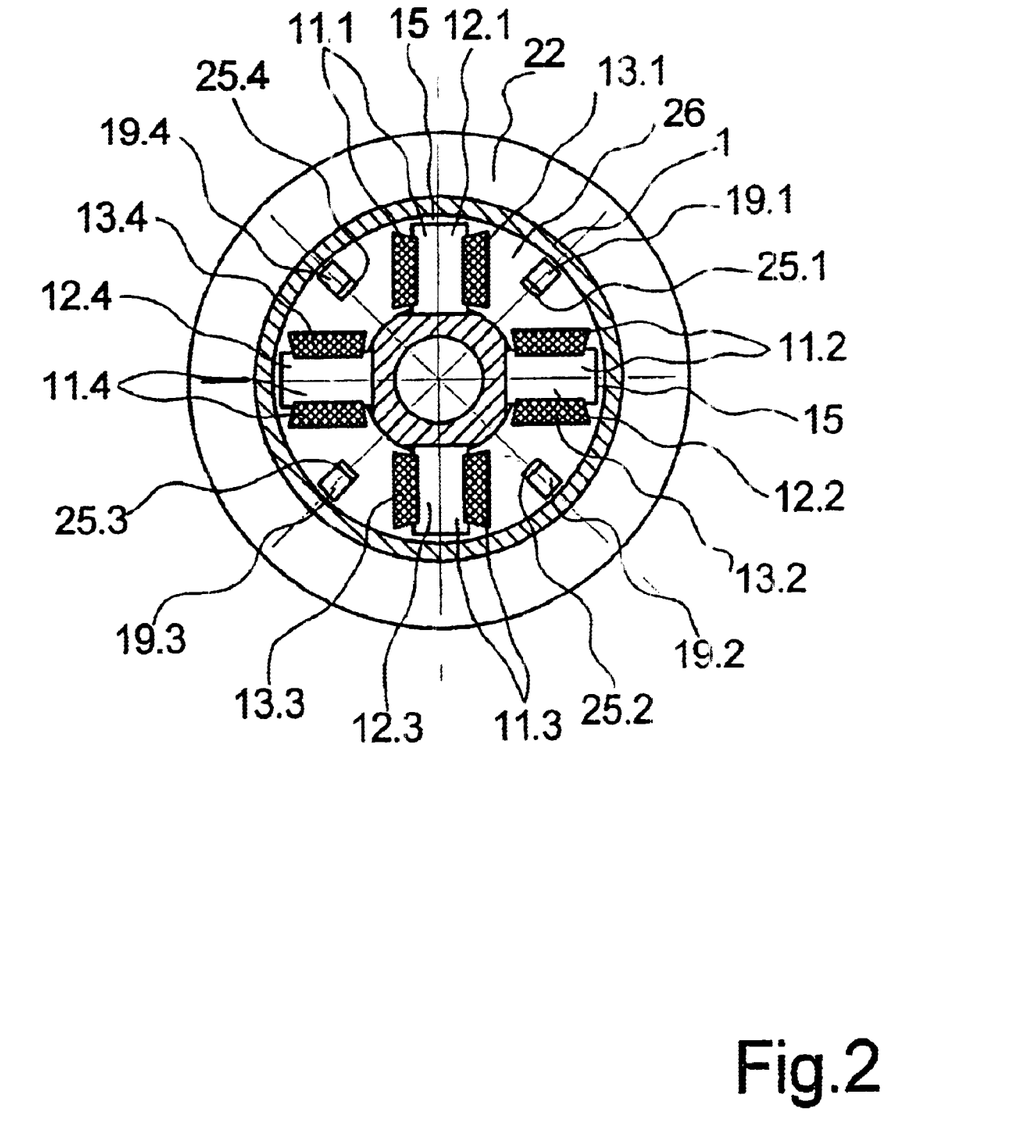
Figure 3:
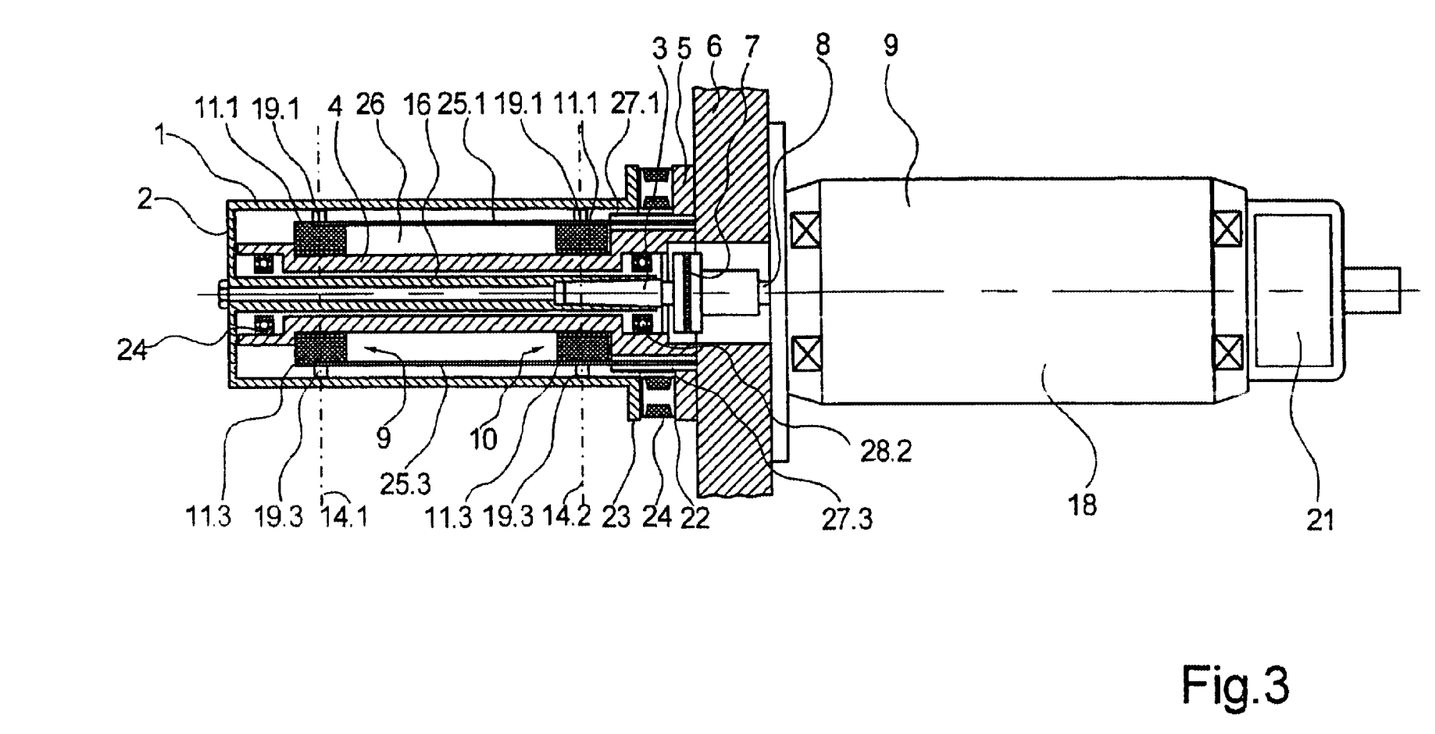

A first exemplary embodiment of the cylinder in accordance with the present invention in the form of a godet wheel is represented in FIGS. 1 to 3. FIG. 1 shows the parts of the godet wheel essential for the invention in a sectional view extending parallel with and through the axis of rotation, FIG. 2 shows a sectional view through one of the bearing levels perpendicularly in respect to the axis of rotation 18, and FIG. 3 shows a sectional view extending parallel with the axis of rotation 18, offset at an angle in respect to the view of the cylinder of the invention represented in FIG. 1. The following description therefore applies to each of FIGS. 1 to 3, provided no explicit reference is made to one of the drawing figures. The exemplary embodiment of the cylinder in accordance with the invention is embodied as a godet wheel. The godet wheel has a cylinder jacket 1 which is fixedly connected with a shaft 3 extending in the interior of the cylinder jacket 1 against relative rotation by means of a front wall 2 and a hub 16. With its oppositely located end, the shaft 3 is connected to a drive shaft 8 of a motor 9 by means of a coupling 7. The motor 9, preferably embodied as an electric motor, is not shown in detail in FIG. 1 and FIG. 3.

The cylinder jacket 1 is seated by means of two radially acting magnetic bearings 9 and 10 on a protruding support 4. The support 4 is embodied to be hollow and cylindrical and extends inside the cylinder jacket 1 into close proximity to the front wall 2. Here, the shaft 3 and the hub 16 penetrate through the hollow-cylindrical support 4. The support 4 is fastened to a machine frame 6 on the side located opposite the front wall 2 by means of a collar 5.

The magnetic bearings 9 and 10 are fastened at a distance from each other on the circumference of the support 4, with the magnetic bearing 9 being located on a free end of the support 4, and the magnetic bearing 10 being located in the area of the fixedly clamped end of the support 4. Each of the magnetic bearings 9 and 10 has four bearing pole windings 11.1 to 11.4, which are distributed on the support on respective bearing levels 14. Each one of the bearing pole windings 11. 1 to 11.4 comprises an exciter winding 12 and a pole element 13. Accordingly, the bearing pole elements 11.1 to 11.4 have the pole element 12.1 to 12.4. The bearing pole windings 11.1 to 11.4 of the respective magnetic bearings 9 and 10 are identically designed. A bearing gap 5 is formed between the respective bearing pole windings 11. 1 to 11.4 and the cylinder jacket 1. The cylinder jacket 1 is designed to be ferromagnetic in the area of the bearing levels 14, so that a magnetic force can be generated between the bearing pole windings 11.1 to 11.4 and the cylinder jacket 1. The position of the cylinder jacket 1 is monitored by several sensors 19. For this purpose, four sensors 19.1 and 19.4 are respectively arranged in the circumferential direction on the bearing levels 14.1 and 14.2 between the bearing pole windings 11.1 to 11.4. Each of the sensors 19.1 and 19.4 is held by a sensor support 25. The sensor support 25 is designed in a rod shape and one end is fixedly connected with the machine frame 6. The sensor support 25 projects through an opening 27 into the annular space 26 formed between the support 4 and the cylinder jacket 1. One sensor for detecting the position of the cylinder jacket is respectively attached to the sensor support 25 in the area of the bearing levels 14.1 and 14.2 in the interior of the annular space 26. In this case, the sensors 19 are preferably embodied as distance sensors, which monitor a gap formed between the cylinder jacket 1 and the sensor 19.

As can be seen in FIG. 2, a total of four sensor supports 25.1, 25.2, 25.3 and 25.4 are arranged in the annular space 26. In this case, the sensor supports 25.1 to 25.4 are arranged by 45° offsets between the bearing pole windings 11.1 to 11.4. Two sensors 19 are located on each sensor support 25.1 to 25.4, which are respectively positioned in the area of the bearing levels 14.1 and 14.2.

The sensors 19 on the bearing levels 14.1 and 14.2, together with the bearing pole windings 11 of the magnetic bearings 9 and 10, are coupled by a control unit 21 to respectively form a control circuit.

As represented in FIGS. 1 and 3, on its end facing the machine frame 6, the diameter of the collar 5 of the support 4 is greater than the two coincident diameters of the front wall 2 and the cylinder jacket 1. The collar 5 of the support 4 has a step 22 with a ring-shaped surface toward the cylinder jacket 1, wherein the diameter of the collar 5 toward the step 22 is slightly less than the inner diameter of the cylinder jacket 1. With its free end located opposite the front face 2, the cylinder jacket 1 extends as far as in front of the step 22 and has a narrow collar 23 at this end. The diameter of the collar 23 corresponds to the diameter which, compared with the collar 23 is wider, of the collar 5 of the support 4 on its end facing the machine frame 6. A magnetic axial bearing 24 is located on the collar 23 of the cylinder jacket 1. Here, bearing pole elements, provided with exciter windings, of the axial bearing 24 are arranged on the step 22 of the collar 5 of the support 4 and point in the direction of the collar 23 of the cylinder jacket 1.

Furthermore, at least one mechanical, contactless free radial bearing 28, is provided as an interception bearing. In this example, the ends of the support 4 have annular depressions pointing in the direction of the hub 16 of the cylinder jacket 1, each of which receives one of the radial bearings 28 arranged on the support 4. Narrow gaps exist between the radial bearings 28.1 and 28.2 and the hub 16.

Thus, emergency running of the cylinder jacket, independently of the magnetic bearing, is assured by means of the radial bearings 28.1 and 28.2.

The exemplary embodiment of the cylinder represented in FIGS. 1 to 3 is used particularly for conveying, drafting or heating of yarn. To this end, the yarn is guided over the circumference of the cylinder jacket 1, which is driven at a predetermined circumferential velocity by the electric motor 9. In the process, the actual position of the cylinder jacket is continuously measured by means of the sensors 19.1 to 19.4 on the bearing level 14.1, as well as on the bearing level 14.2. The sensor signals are fed to the control unit 21 arranged on the drive side. A reference position of the cylinder jacket 1 is stored in the control unit 21. In this case, the reference position of the cylinder jacket 1 is a position of the cylinder jacket 1 which is stationary in respect to the machine frame 6. Thus, this stationary reference position of the cylinder jacket 1 is established by defined distances to the sensors 19. The sensors 19 are disconnected from the support 4 and the cylinder jacket 1 by means of the sensor supports 25. Therefore, no vibrations caused by the rotation of the cylinder jacket occur at the sensor supports 25. Accordingly, the sensor arrangement for detecting the cylinder jacket is disengaged from the actuating device for seating the cylinder jacket.

The actual position of the godet wheel jacket is determined in the control unit 21 from the sensor signals, in order to generate appropriate control signals for correcting the position from the difference between the actual position of the cylinder jacket and the reference position of the cylinder jacket. The control signals are applied via respective control devices to the magnetic bearings 9 and 10, in particular the bearing pole windings 111.1 to 11.4, which change the magnetic forces acting between the bearing pole windings 111 and the cylinder jacket 1 and in this way cause a position correction of the cylinder jacket.

Figure 4:
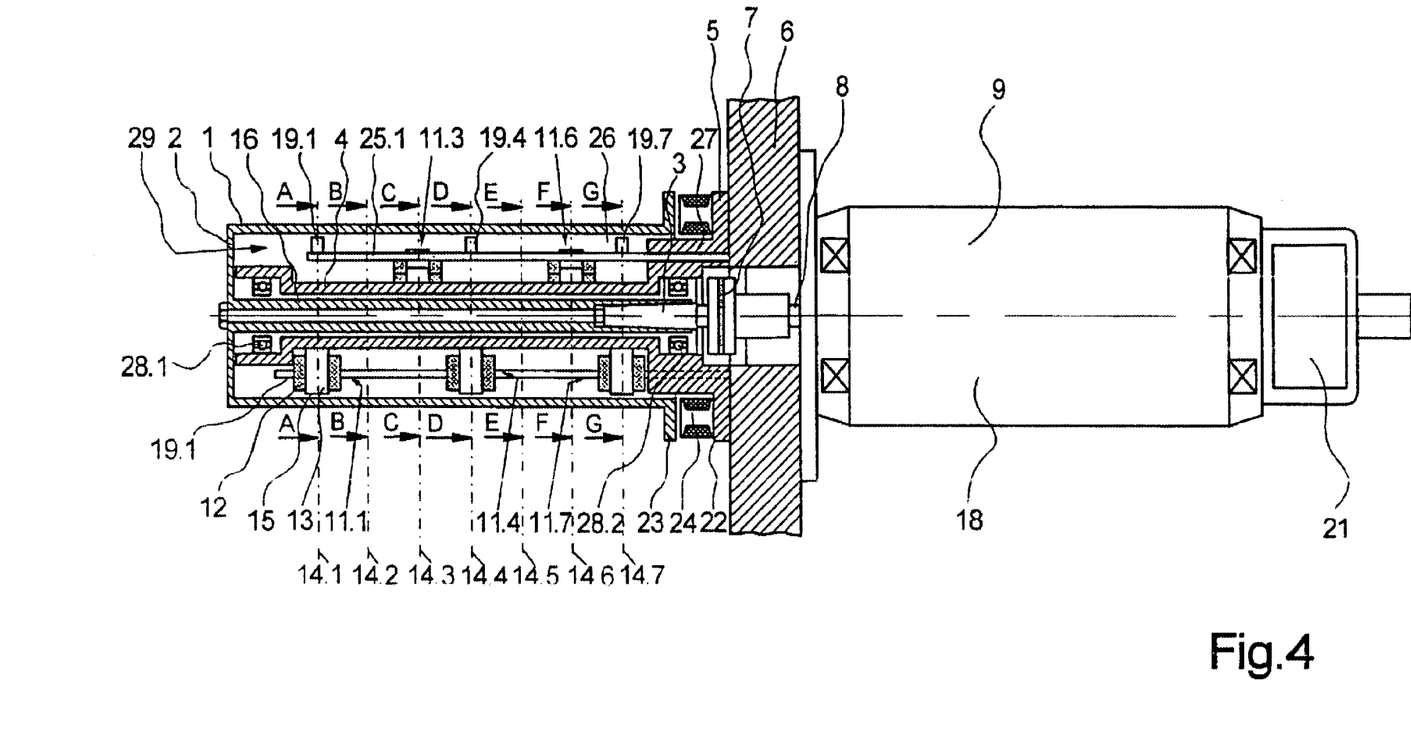
FIGS. 4 and 5 schematically depict a further exemplary embodiment of the cylinder in accordance with the invention.
Figure 5:
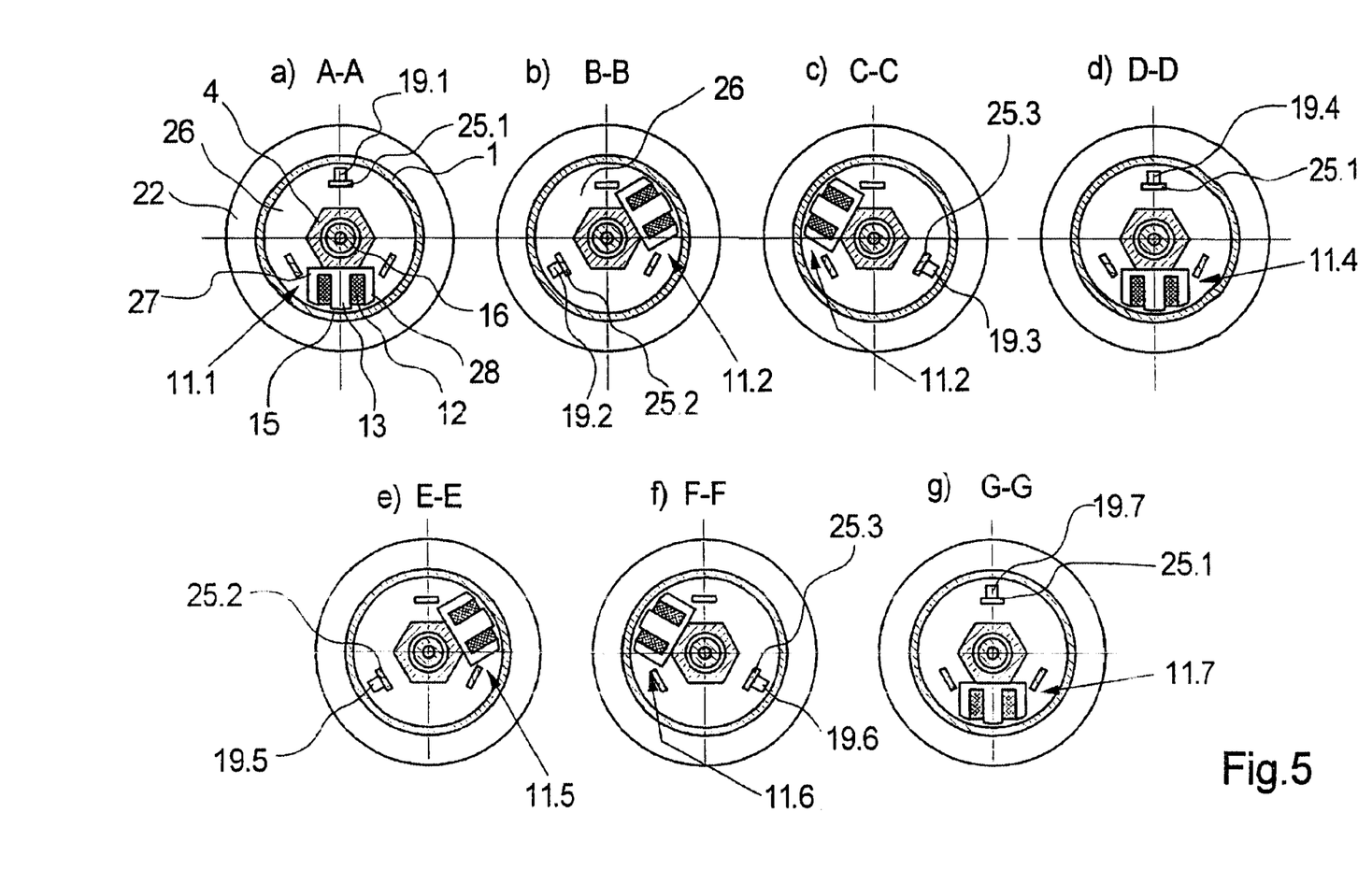

A further exemplary embodiment of a cylinder in the form of a godet wheel is represented in FIGS. 4 and 5. FIG. 4 shows the parts of the cylinder essential for the invention by means of a section extending parallel with and through the axis of rotation 18, and FIGS. 5(a) to 5(g) show sections perpendicular to the axis of rotation corresponding to the bearing levels.

The following description therefore applies to FIGS. 4 and 5, provided no explicit reference to one of these drawing figures has been made. Essentially the exemplary embodiment corresponds to the exemplary embodiment of the cylinder of the invention in accordance with FIGS. 1 to 3, so that only the differences will be explained hereafter, and otherwise reference is made to the previous description. For clarity, the components with the same functions have been provided with identical reference symbols.

The cylinder jacket 1 is seated by means of a radially acting magnetic bearing 29 on the protruding support 4. The magnetic bearing 29 has a plurality of bearing pole windings 11.1 to 11.7, which are distributed on several bearing levels 14 on the cylindrical support 4. Each one of the bearing pole windings 11.1 to 11.7 is comprised of an exciter winding 12 and a pole element 13. A total of seven bearing pole windings 11.1 to 11.7 are arranged on seven bearing levels 14.1 to 14.7, which are located next to each other, on the outer circumference of the support 4. In this case the bearing pole windings 11.1 to 11.7 are arranged angularly offset from bearing level to bearing level on the support 4.

Respective cross sections of each bearing level 14.1 to 14.7 of the cylinder are represented in FIG. 5, wherein the bearing level 14.1 is represented in FIG. 5(a), the bearing level 14.2 in FIG. 5(b), the bearing level 14.3 in FIG. 5(c), etc. The bearing pole windings 11.1 to 11.7 are arranged, angularly offset from bearing level to bearing level, on the cylindrical support 4. The angular positions of the bearing pole windings 11.1 to 11.7 are 180°, 60°, 300°, 180°, 30° and 180°. Therefore the angular offset of the bearing pole windings 11.1 to 11.7 from bearing level to bearing level is 120°. The bearing pole windings 11.1 to 11.7 form a helix around an axis of rotation 18 of constant pitch because of identical angular offsets and identical distances between the bearing levels. A bearing gap 15 is formed between each of the bearing pole windings 11.1 to 11.7 and the cylinder jacket 1.

For monitoring the bearing gap 15, or for detecting the actual position of the cylinder jacket 1, a sensor 19.1 to 19.7 is assigned to each one of the bearing pole windings 11.1 to 11.7. Only the sensors 19.1, 19.4, 19.7 are visible in FIG. 4. The sensors 19.1 to 19.7 are embodied on several sensor supports 25 identically with the previous exemplary embodiment, and are fixedly attached to the machine frame 6. As can be seen in FIG. 5, a total of three sensor supports 25 are arranged in the annular space 26 formed between the support 4 and the cylinder jacket 1. The sensor supports 25.1, 25.2 and 25.3 have an angular offset of 120°. To the sensor support 25.1 are attached the sensor 19.1 on the bearing level 14.1, the sensor 19.4 on the bearing level 14.4 and the sensor 19.7 on the bearing level 14.7. To the sensor support 25.2, arranged offset by 120°, are attached the sensor 19.3 on the bearing level 14.3 and the sensor 19.6 on the bearing level 14.6. To the sensor support 25.3, again arranged offset by 120°, are attached the sensor 19.2 on the bearing level 14.2 and the sensor 19.5 on the bearing level 14.5. In each case, the sensors 19 are arranged opposite the bearing levels, i.e. offset by 180° in relation to the bearing pole windings 11. The sensors 19.1 to 19.7 are connected via signal lines, not represented, with a control unit 21. The control unit 21 is connected with the exciter windings 12 of the bearing pole windings 11.1 to 11.7 via a control device and control lines.

During operation, the actual position of the cylinder jacket 1 is measured by means of the sensors 19.1 to 19.7 and supplied to the control unit 21. The actual position of the cylinder jacket is compared in the control unit with a stored difference position of the cylinder jacket. In the course of this operation, every single control signal is directly converted into a corresponding control signal for triggering the respectively associated bearing pole winding 11. In this manner, it is possible to determine from the signal from the sensor 19.1, which signals the instantaneous distance between the sensor 19.1 and the cylinder jacket 1, the difference from a set point distance, which defines the stationary reference position of the cylinder jacket. Thereupon, a control signal for triggering the bearing pole winding 11.1 is generated in the control unit 21 and directly applied to the bearing pole winding 11.1 by means of a control device. The change in excitation of the bearing pole winding 11 leads to a desired change of the magnetic force, so that a direct position correction of the cylinder jacket 1 is performed. The bearing pole windings 11.2 to 11.7 are correspondingly controlled by the respective evaluation of the sensor signals from the sensors 19.2 to 19.7. A level seating of the cylinder jacket 1 is achieved by the cooperation of the bearing pole windings 11.1 to 11.7.

Figure 6:
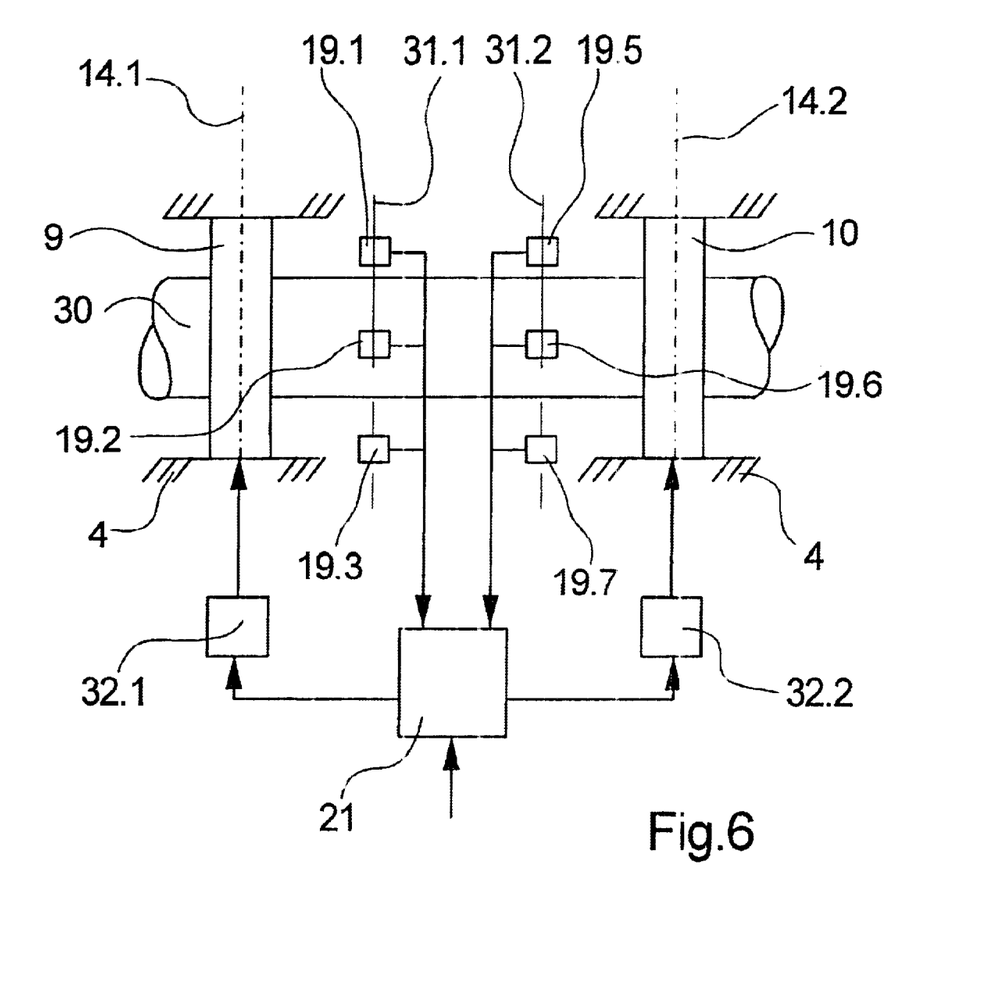
FIG. 6 is a diagram of a bearing control of a cylinder in accordance with the invention.

A diagram of a bearing control, such as could be embodied in the exemplary embodiment in FIGS. 1 to 3, for example, is represented in FIG. 6. Here, the cylinder jacket is represented by a shaft 30. The shaft 30 is seated in two places by the magnetic bearings 9 and 10. In this case, the magnetic bearings 9 and 10 can be designed in accordance with the exemplary embodiment in FIG. 1. The magnetic bearings 9 and 10, which are supported on the support 4, constitute respective bearing levels 14.1 and 14.2. Two groups of sensors are arranged between the bearing levels 14.1 and 14.2 on two levels 31.1 and 31.2. The levels 31.1 and 31.2 extend parallel with the bearing levels 14.1 and 14.2. The sensors 19.1, 19.2, 19.3 and 19.4 are arranged on the level 31.1 and are evenly distributed over the circumference of the shaft for detecting an actual position of the shaft 30. The sensor 19.4 on the plane 31.1 is located at the back of the shaft 30 and is not visible in the drawing.

The sensors 19.5, 19.6, 19.7 and 19.8 (not visible) are arranged on the level 31.2, also evenly distributed over the circumference of the shaft 30. The sensors 19 are each fixed in place for detecting the position of the shaft 30. The sensors 19.1 to 19.4, as well as the sensors 19.1 to 19.8 are connected with a control unit 21. At least one microprocessor is provided in the control unit 21, which transmits the respective sensor signals regarding an actual position of the shaft on the levels 31.1 and 31.2. Control signals are generated as a function of the difference between the actual position and the reference position stored in the control unit 21 and are applied by the control unit 21 via respective control devices 32.1 and 32.2 to the magnetic bearings 9 and 10 for changing the bearing gap.

The bearing control represented in FIG. 6 is particularly suited for detecting vibrations of a cylinder jacket and to damp them. To this end, chronological changes of the actual position of the shaft, or of the cylinder jacket, are determined from the sensor signals which indicate the actual position of the shaft, or of a cylinder jacket, and are brought into a relation with the respective rotary frequency of the shaft. A sequence of control signals to the associated magnetic bearings is then generated in the control unit, which control signals cause bearing forces on the shaft, which counteract the position change of the shaft. The sequence of the control signals is applied to the magnetic bearings via the control device 32 at the appropriate rotary frequency.

The possibility of detecting vibration shapes of the shaft by means of the equalization of the signals is provided by the design of two levels 31.1 and 31.2, each of which constitutes a measuring spot for detecting the position of the shaft. For example, in case of a first order sympathetic vibration, the characteristic distance signals from the sensors in the measuring spot 31.1 and the measuring spot 31.2 are equi-phased, i.e. the changes in the actual position of the shaft appear chronologically identical. However, a second order sympathetic vibration is detected in that the phase position of the changes in the actual position of the shaft occur phase-shifted by 180°. Thus, by means of the magnetic bearings 9 and 10, there is the possibility of generating a frequency which is oppositely oriented to the excitation, so that the vibration amplitude in the resonance range is damped.

Therefore the arrangement represented in FIG. 6 constitutes a particularly advantageous possibility for performing vibration damping of a cylinder jacket. To this end, the magnetic bearings 9 and 10 are triggered at a frequency which counteracts the vibration. Each positional change of the shaft, or of a cylinder jacket, caused by the vibration is directly damped by a counter-force of the magnetic bearing.

The embodiments represented in FIGS. 1 to 6 are exemplary in the embodiment of the individual components. It is possible in particular to employ optical sensors, which perform a scan of the cylinder jacket from a reference position, for detecting the actual position of the cylinder jacket. For example, the optical measurement could be performed by means of a laser beam, which is partially covered by an element attached to the cylinder jacket. The cover would be detected with the aid of an optical sensor, which would have to be at a location where the measurement is to be performed. It can also be practical to perform a measurement in respect to a stable reference position outside of the cylinder, for example for detecting and compensating vibrations of the entire system.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A cylinder for guiding at least one yarn, comprising a hollow-cylindrical cylinder jacket, a support on which the cylinder jacket is rotatably seated, at least one magnetic bearing having a plurality of bearing pole windings distributed on the support circumferentially relative to the cylinder jacket, and a plurality of cylinders for determining an actual position of the cylinder jacket, wherein the sensors and the bearing pole windings are coupled with each other by a control unit, and wherein the sensors are fixed in place with a gap from the cylinder jacket and with a gap from the support for determining the actual position of the cylinder jacket in relation to a stationary reference position or the cylinder jacket.

2. The cylinder in accordance with claim 1, further comprising a plurality of protruding sensor supports each fixedly connected with the machine frame and each supporting at least one sensor.

3. The cylinder in accordance with claim 2, wherein the sensor supports are arranged inside an annular gap formed between the cylinder jacket and the support.

4. The cylinder in accordance with claim 1, wherein the sensors and the bearing pole windings are together arranged on one bearing level.

5. The cylinder in accordance with claim 1, wherein the sensors and the bearing pole windings are distributed on several adjoining bearing levels.

6. The cylinder in accordance with claim 1, wherein one of the sensors is associated with each one of the bearing pole windings, wherein the control unit converts the sensor signal from each respective sensor into a control signal for controlling the associated bearing pole winding.

7. The cylinder in accordance with claim 6, wherein the bearing pole windings are arranged in pairs on one bearing level at essentially 180° offsets from each other, with one of the sensors being associated with each pair of bearing poles, and wherein the control unit converts the sensor signal from the sensor into a control signal for controlling the assigned pair of bearing poles.

8. The cylinder in accordance with claim 1, wherein a group of sensors is associated with each one of the bearing pole windings, wherein the control unit converts the sensor signals from the sensors into a control signal for controlling one of the bearing pole windings.

9. The cylinder in accordance with claim 1, wherein the cylinder jacket is seated on two radially acting magnetic bearings whose bearing pole windings are arranged on at least two bearing levels, and wherein a group of sensors are associated with each magnetic bearing, the sensors being respectively arranged on an adjacent level between the bearing levels.

10. The cylinder in accordance with claim 9, wherein each group of sensors is connected with the control unit, the control unit being adapted to perform an evaluation of the sensor signals for determining the position and vibration of the cylinder jacket and to generate and apply control signals to the associated bearing pole windings for position correction and vibration damping.

* * * * *